C. S. WELLS.
Assignor to H. W. GARLAND.
CONVEYER.
No. 11,206. Reissued Dec. 1, 1891.
Fig. 3.
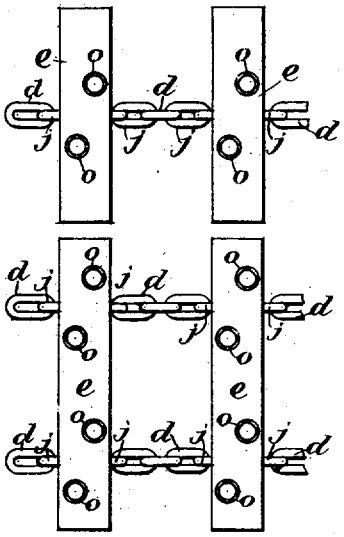
Fig. 1.
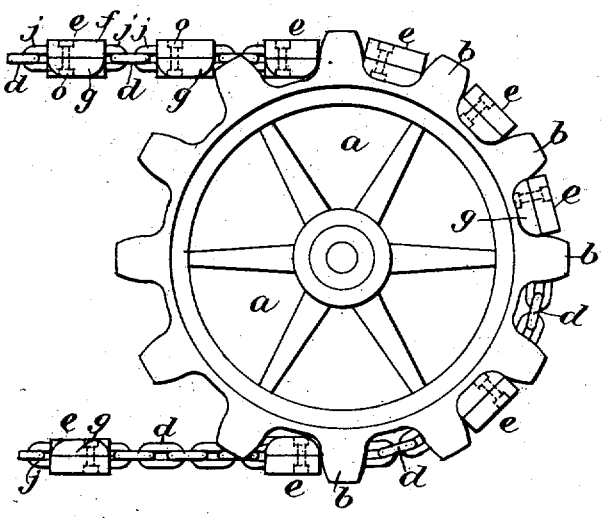
Fig. 4.
Fig. 2.
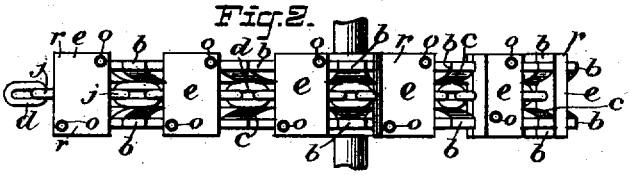
Fig. 6.
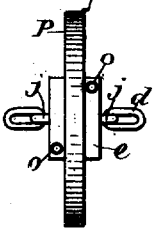
Fig. 5.
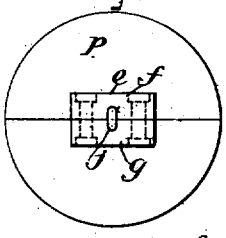
Fig. 8.
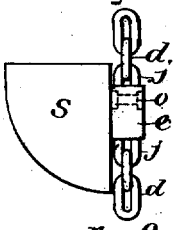
Fig. 7.
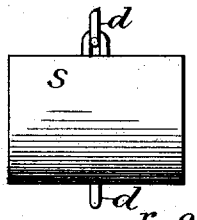
Fig. 9.
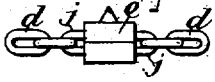
Fig. 10.
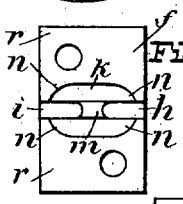
Fig. 11.
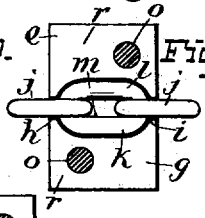
Fig. 12.
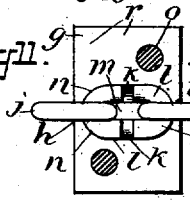
Fig. 13.
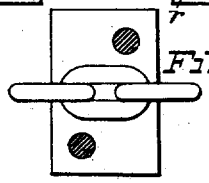
ATTEST:
J. H. Hundley
B. Fox
INVENTOR:
Charles S. Wells
By J. N. McGuire
Attorney
THE NORRIS PETERS CO., PHOTO-LITHO., WASHINGTON, D. C.

UNITED STATES PATENT OFFICE.

CHARLES S. WELLS, OF BAY CITY, MICHIGAN, ASSIGNOR TO HARRY W. GARLAND, OF SAME PLACE.

CONVEYER.

SPECIFICATION forming part of Reissued Letters Patent No. 11,206, dated December 1, 1891.

Original No. 406,186, dated July 2, 1889. Application for reissue filed January 27, 1891. Serial No. 379,181.

*To all whom it may concern:*

Be it known that I, CHARLES S. WELLS, a citizen of the United States, residing at Bay City, in the county of Bay and State of Michigan, have invented certain new and useful Improvements in Conveyers and Power-Transmitters; and I do hereby declare the following to be such a full, clear, and exact description of the invention as will enable those skilled in the art to which it appertains to make and use the same, reference being had to the accompanying drawings, which form part of this specification.

This invention relates to conveyers and power-transmitters of the class in which an ordinary welded-link endless chain passed over two or more sprocket-wheels is used as a cable for transmitting motion and for conveying or transferring material of various forms and conditions to various places.

The object of this invention is to provide a conveyer-cable with a series of engaging devices or blocks, which, while held rigidly in position in relation to any movement lengthwise of the cable, will allow the links of the cable to rock or move in their bearings in said blocks, whereby an uneven strain upon the cable is avoided; and the invention consists in the combination, arrangement, and construction of the parts, as will be hereinafter more fully described and as specifically set forth in the claim of this specification.

In the accompanying drawings, Figure 1 is a side view of a sprocket-wheel with portion of a transmitting-chain thereon embodying my improvement. Fig. 2 is a top or plan view of the same. Fig. 3 is a plan view of the improved device as attached to a conveyer-chain. Fig. 4 is the same, with a double chain for conveying slabs, edging, sawdust, coal, &c., and mill-refuse. Figs. 5 and 6 are front and side views showing the device arranged for conveying grain, sawdust, and other fine material. Figs. 7 and 8 represent front and side views of my improvement arranged for conveying elevator-buckets. Fig. 9 shows the device arranged for moving and hauling logs. Figs. 10 and 11 are details of the clamping-block detached, the chain being left in place on that one of the parts of said block seen in the last-named figure. Fig. 12 shows the manner of securing divided ends of the chain together. Fig. 13 is a modified form of the device shown in Figs. 10 and 11.

*a* is a sprocket-wheel of that well-known form in which the periphery of the wheel is grooved (circumferentially) between the annular flange-like parts that are notched or cut out to form teeth in pairs, with which teeth engage the sprocket-like devices of the endless chain *d*, that is accommodated laterally between the said pairs of teeth, the said chain passing, also, over a second sprocket-wheel of a like character located at some distance from and in proper alignment with the first wheel, (one only being shown in the drawings.) At suitable intervals upon the chain *d* and transversely across the same are secured the bars or blocks *e*, the end portions *r* of the blocks projecting laterally beyond the chain, so that they rest in the depressions between the sprocket-teeth *b* as the chain passes over the wheels. These blocks *e* are formed of two sections or parts *f* and *g*, each section being provided with a transverse recess (shown in Figs. 10 and 11) which fits over and covers one-half of the chain, the recess being provided with the outer portions *h* and *i* to receive and fit upon the vertical links *j* of the chain and with the central portion *k*, which receives and fits over the horizontal link *l*, which is between and joins the adjacent vertical links *j*. The portion *k* of the recess is also provided with a part *m*, projecting upwardly from the middle of the recess and formed and fitted to engage with the central opening of the horizontal link *l*, so that when the sections are passed over the chain the said links rest in the recesses and the parts *m* extend into and engage with the horizontal central link, with the opposite outer faces of the parts *m* and of the laterally-extending portions *r* of the block bearing upon each other, and they are then secured in this position by bolts or rivets *o*, which are passed through the sections on opposite sides of the chain.

The contour of the projecting ends *r* is preferably adapted to conform to the contour of the depressions between the projecting teeth of the sprocket-wheels, and the series may be so spaced upon the chain that one will pass into each space on the wheel, as shown in the upper portion of Fig. 1, or, if desired, they may be arranged to engage with each alternate space, as shown in the lower portion of the same figure.

It will be seen that while the chain is not seated on the bottoms of the grooves or spaces formed between the pairs of teeth of the wheel, so that there is no liability of dirt getting packed in between the chain and the wheel, the chain, being provided with the transverse blocks, as set forth, makes in passing over the wheels an interlocking engagement with the teeth thereof, which transmits a positive motion from the driving to the driven wheel. This form of chain transmitter is particularly adapted for use in conveyers and elevators, &c.

By adding to the clamping-blocks *e* a disk *p* (shown in Figs. 5 and 6) an elevator or conveyer bucket is formed, which is adapted to conveying grain, flour, sawdust, &c., the chute or trough being of a suitable configuration transversely to fit the peripheries of the disks, and the disks may be arranged upon each clamping-block of the series or upon alternate blocks, or may be even farther apart, as necessary or desirable.

In Fig. 3 is shown the device arranged as a conveyer, having the transverse bars or blocks *e* of considerable length and adapted for use in saw-mills for transferring bark, edgings, saw-mill refuse, &c.

In Fig. 4 is shown the same having a double chain, the transverse blocks *e* extending entirely across both of the chains, to which they are clamped at a point near their ends, the bar itself being divided, or the conveyer-bars may be placed upon and secured to the clamping-blocks, as most convenient and desirable.

In Figs. 7 and 8 are shown elevator-buckets *s*, attached to the conveyer-chain by means of my improved clamping device.

In Fig. 9 is shown a form of device or invention adapted to the purpose of hauling logs endwise into a saw-mill, the cross-bars being provided with projecting spurs which catch into engagement with the log.

In Fig. 12 is illustrated the manner of connecting the ends of a chain together. The central or horizontal link *l* being divided transversely, the parts thereof are caught or linked in the usual manner into the adjacent vertical links *j*, and the parts are then placed with the divided horizontal link in the central portion *k* in the usual manner. The parts of the block being placed together in their usual position and firmly secured by the bolts *o*, the divided link then, on the chain being pulled, rests with its outer curved ends *q* against the ends *n* of the depression *k*, the narrower depressions *h* and *i* (see Fig. 10) not permitting the sections of the parted link to pass through. By this means a portion of the chain may at any time be easily removed or replaced and the length of the space will remain the same. It will be seen that the central raised portion *m* may be omitted entirely and the blocks will still remain in position, the pulling strain in that case acting entirely upon the ends *n* of the depression *k*; but for general use the portions *m* are preferable, as they then receive a portion of the pulling strain, which operates to relieve the end portions *n*.

It will be readily seen, of course, that by means of my improvement any desired form of conveying device may be attached to the chain in an effective and substantial manner, and it is also evident that, as shown in Fig. 13, the form of the recesses in the sections of the transverse block may be changed, the central portion of the recesses being changed to receive the vertical link and the outer portion changed to receive the horizontal link, and the device will then operate the same and the result produced will be of a like character.

Another and great advantage of this improvement is that the links of the chain are entirely flexible in all directions, the transverse recess fitting over the links being so arranged as to allow the links to lie loosely therein and permit the cable to pass over the peripheries of the sheaves without undue strain of any of its parts, which obviates a serious fault which obtains in the common form of wire-rope cables when used as a power-transmitter and run over revolving wheels, and more especially in wire rope used as a conveyer-cable and on which a series of transverse blocks are held in frictional contact with the cable, the continued bending and straightening of the cable in passing over the wheels and the strain of the driving-pulley on the transverse blocks causing the outer strands of the cable to receive more than their proportion of the strain, which has a tendency to quickly part the cable at the point of contact with the edge of the blocks.

I am aware, as I have before stated, that wire-rope cables having engaging blocks rigidly secured thereto at intervals and held by frictional contact are in use, and therefore I do not claim such a device or combination, as my invention is especially designed to overcome the objections and difficulties attending the use of that form of conveyer; and Having explained the construction and operation of my invention, what I claim as new, and desire to secure by Letters Patent, is—

In a power-transmitter, the combination, with suitable sprocket-wheels, of an endless chain composed of links arranged alternately in planes at right angles to each other, and a series of wheel-engaging blocks or sprocket-like devices, each of which consists of two parts securely bolted together and between which parts the links, embraced by said parts, are held against movement endwise relatively to said parts, while left free to articulate to some extent, substantially as and for the purposes hereinbefore set forth.

In witness whereof I have hereunto set my hand this 13th day of October, 1890.

CHARLES S. WELLS.

In presence of—

HEZEKIAH M. GILLETT,
HENRY J. AUGER.